United States Patent [19]

Brayman et al.

[11] Patent Number: 4,532,795

[45] Date of Patent: Aug. 6, 1985

[54] METHOD OF TEMPERATURE COMPENSATING LEAK RATE TESTING

[76] Inventors: Semyon Brayman, 28023 Berkshire, Southfield, Mich. 48076; Ronald N. Bullock, 7520 Merrick, Taylor, Mich. 48180

[21] Appl. No.: 602,712

[22] Filed: Apr. 23, 1984

[51] Int. Cl.³ .............................................. G01M 3/26
[52] U.S. Cl. ........................................ 73/40; 73/49.2; 374/4
[58] Field of Search ...................... 73/40, 49.2, 40.5 R, 73/708; 374/4

[56] References Cited

U.S. PATENT DOCUMENTS 3,987,664 10/1976 Hass et al. ............................. 73/49.2
4,272,985 6/1981 Rapson, Jr. et al. .................. 73/49.2

FOREIGN PATENT DOCUMENTS 2912100 11/1980 Fed. Rep. of Germany .......... 73/40
55-43406 3/1980 Japan ...................................... 374/4
56-79230 6/1981 Japan ...................................... 374/4

*Primary Examiner*—Benoit Castel
*Attorney, Agent, or Firm*—John R. Benefiel

[57] ABSTRACT

A method of compensating for temperature variations in testing part cavities for leaks by placing a fluid pressure source in communication with the cavity and measuring the flow rate to the cavity to determine the rate of any leakage. The method establishes a temperature compensation function by measuring the shift in flow rates resulting from changes in temperature of a sample test part, which temperature compensation function allows correction of the flow rates during subsequent testing according to the sensed temperature of the test part. Flow rates are measured at two differing temperatures to determine the temperature compensation function by linear regression, since the flow rate shift with temperature varies substantially linearly.

4 Claims, 5 Drawing Figures

METHOD OF TEMPERATURE COMPENSATING LEAK RATE TESTING

BACKGROUND DISCUSSION

This invention concerns leak testing and more particularly leak testing of cavities in test parts by flow rate measurement. Such leak testing procedures have heretofore been practiced by placing a source of fluid under pressure in communication with the cavity to be tested, and measuring the flow rate to the cavity, after allowing stabilization of the flow to a steady state flow condition. Under these circumstances, the flow to the cavity after stabilization will equal the flow from the cavity, i.e., the leakage flow. If no leak is present, then the rate of fluid flow to the cavity from the pressure source will be zero.

In more refined versions of the method, a prefill fluid circuit is employed in which a high capacity passage is initially placed in parallel communication between the fluid pressure source and cavity together with a small capacity passage within which the flow measurement takes place. This allows a relatively large volume of flow to the cavity initially to rapidly pressurize the cavity. The second low capacity flow passage is solely in communication with the pressure source and cavity after the prefill interval, and flow through the lower capacity passage is measured after the establishment of steady state conditions to evaluate the leakage of the cavity. This two-stage pressurization allows a relatively rapid test cycle, since pressurizing the cavity with fluid under pressure through the low flow rate capacity passage would take an excessive interval of time.

In a still more refined version of the method, an even more rapid test cycle is achieved by measuring the flow rate well prior to the establishment of steady state flow conditions and extrapolating the flow rate to steady state conditions.

This is made possible by determining the earliest point in the pressurization cycle after which the flow rates become repeatable for a given leak rate. It has been observed that a repeatable correspondence between transient flow rates and the steady state flow rates allows accurate extrapolation from the transient but repeatable flow rates occurring earlier in the test cycle to the steady state flow rates.

It has been found that if the temperature of the test part varies significantly over the ambient temperatures and the normal temperature for which the system is calibrated, a wide variation in test results occurs in practicing this leak test method.

This is particularly true for the high speed testing, which does not allow for equalization of the part temperature with the ambient temperature.

Such leak testing is sometimes done with the parts well above or below ambient temperatures as a result of processes performed on the test part just prior to the leak test. It is often not feasible to delay testing until the parts are cooled or warmed to ambient temperatures.

Such leak testing is often conducted on parts of widely varying configuration, which parts are often constructed of many different materials, these factors affecting the way temperature differences change the results of the leak tests. The test pressure and the cycle times are also varied constantly in leak testing different parts, which also affects the change in results due to temperature shifts of the parts.

Disclosed in U.S. Pat. No. 4,272,985 is a pressure decay type leak test system, which employs a method for compensating for temperature variations in the test part. This method requires an additional stage in the test cycle, however, which lengthens the time for completing the leak test. Since such leak testing must be done as part of the production process, lengthening the test cycle time will reduce productivity of the production process.

Also, the method disclosed in that patent is relatively complex.

Accordingly, it is an object of the present invention to provide temperature compensation for leakage testing of test parts to compensate for the effects of significant variations in temperatures of the test parts from ambient temperatures, as the test parts undergo the leak testing.

It is a further object of the present invention to provide such temperature compensation method which is directly applicable to flow rate type leakage testing and particularly adapted to the two-stage type flow rate testing as described above with a prefill high capacity flow coupled with a subsequent low flow rate to the test cavity.

It is still another object of the present invention to provide a simple and reliable method for providing such temperature compensation in leak testing of parts, which is quickly adaptable to parts of widely varying configuration and material, and to tests of widely varying test pressures and cycle times.

SUMMARY OF THE INVENTION

The present invention achieves the above-recited objects by generating, for each set of test parameters, including test part configuration, a set of temperature compensation factors for each part temperature expected to be encountered. Each set of temperature factors comprise a flow shift function varying with temperature and is established by placing a source of fluid under testing pressure in communication with the cavity of a sample test part and measuring the flow rates thereto over a plurality of temperatures of the test parts at times in the pressurization cycle at which the flow rate is to be measured during actual tests. This procedure has been found to enable determination of the changes in flow rates directly attributable to variations in temperatures of the test part.

The many factors which effect a shift in flow rate with temperature of the test part, including the volume of the cavity, the test procedure, the time over which the cycle is executed, the thermal characteristics of the part material and also the configuration or shape of the cavity are all accounted for by this simple, direct test procedure.

In connection with this, it is believed that the heating or cooling of the fluid within the test cavity during testing causes either an increase or decrease of flow to or from the cavity due to the expansion or contraction of the gas fluid disposed therein as it is heated or cooled by heat transfer from the test part.

The difference in flow rate is measured at the same point in time after initiation of pressurization as during the leakage test whereat the flow rates are to be measured.

The present inventors have discovered that an essentially linear relationship exists between temperature and the shift in flow rate in this context such that a simple two temperature measurement of flow rates may be employed for each set of test parameters. Since a linear relationship exists therebetween, a temperature compensation function may be established by linear regression.

The temperature compensation function is preferably stored within the memory of a computer or microprocessor and used to adjust the flow rate measurement values generated during normal testing cycles of the test parts in correspondence with the sensed temperature of the test part, such that a temperature compensated leakage rate may be established during testing of the parts. A number of test part configuration temperature compensation functions may be stored in memory such as to allow temperature compensation for leakage testing of a number of test part configuration types.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
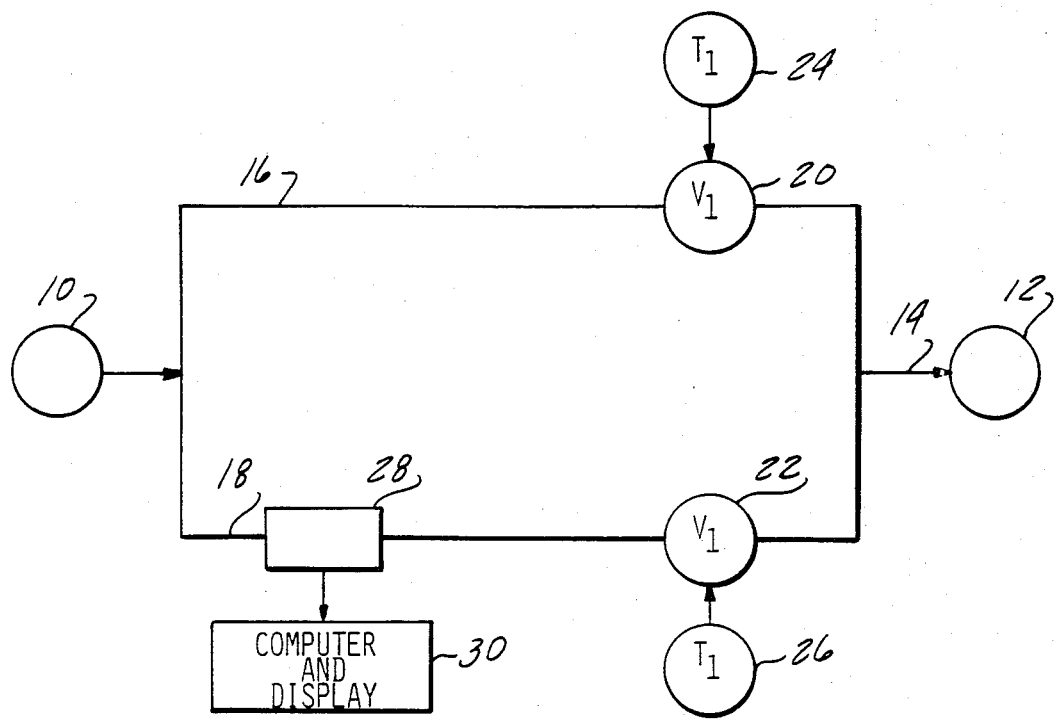
FIG. 1 is a simple diagrammatic representation of a leakage flow rate testing arrangement with which the present method is contemplated as being employed.

As described above, the method of the present invention is contemplated as being employed with a flow rate type leakage testing procedure. This procedure and apparatus, the essentials of which are shown in FIG. 1, include a source 10 of a fluid under pressure which is placed in communication with a test part 12 by means of a testing port 14 over which the test part 12 may be placed to establish a fluid tight communication with a cavity to be tested within the test part 12, as indicated diagrammatically in FIG. 1. This communication is established via a pair of parallel fluid passages, a relatively high flow rate capacity "prefill" passage 16 and a relatively low flow rate capacity passage 18. The communication through passage 16 is controlled by means of a solenoid valve 20, indicated as valve V-1 in FIG. 1, and communication through passage 18 is controlled by solenoid valve 22, indicated as V-2. As is known to those skilled in the art, this prefill passage allows for a rapid prefill or initial pressurization of the cavity in the test part 12 by means of flow in the fluid pressure source 10 through the high capacity passage 16 such as to rapidly bring the passage up to pressure. After the prefill cycle, a timer 24 closes solenoid valve 20 and flow is constrained to be solely through the relatively low capacity passage 18.

Passage 18 establishes communication between the fluid pressure source 10 and the test port 14 by means of the valve 22. Mounted in the low flow rate capacity passage 18 is a flow rate transducer 28 which is adapted to accurately measure very low flow rates and signals generated corresponding thereto, transmitted to a computation and display means 30. Such means may be provided by a microprocessor and suitable indicator lamps which measure the flow rate in the low capacity passage 18.

This measurement may be after achieving steady state flow conditions to (and from) the test part 12. Such flow to the cavity indicates the leakage rate from the cavity of the test part 12. That is, for a non-leaking part, zero flow will occur in the low flow rate capacity passage 18 after steady state flow conditions are established. Such flow rate signal may be utilized to generate a reject or accept indication after comparison with acceptable or unacceptable rates of flow corresponding to leakage rates to the particular test.

Figure 2:
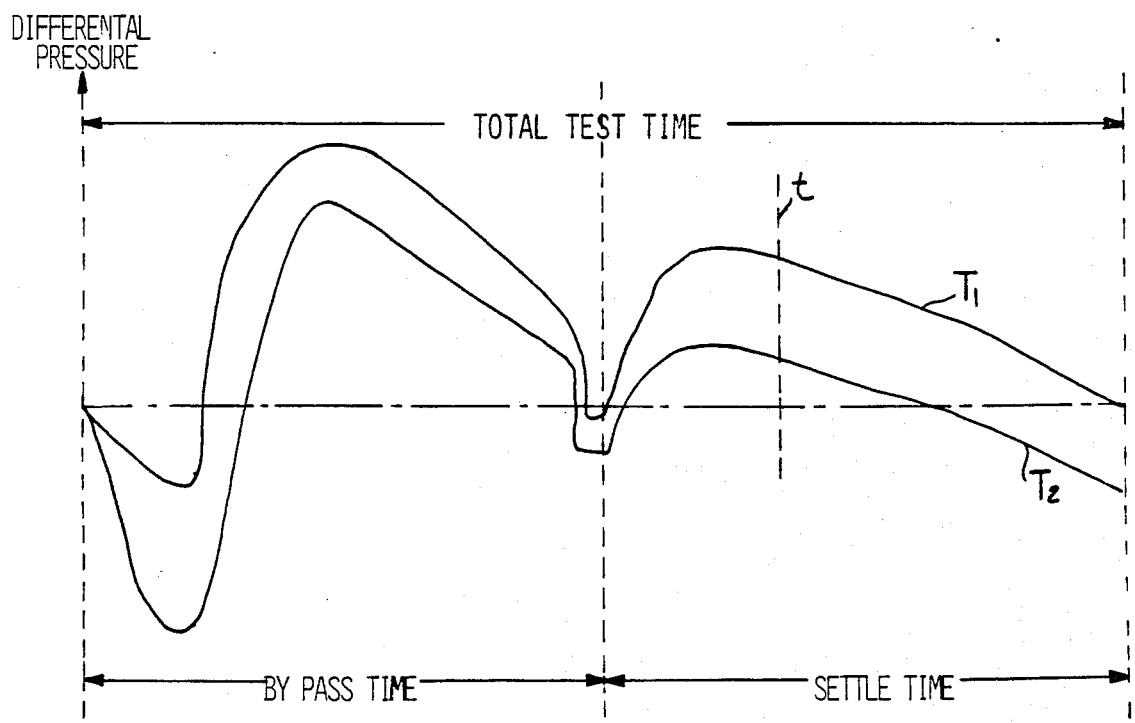
FIG. 2 is a plot of flow rate versus time for a given test part at two different temperatures of the test part, illustrating the shift in flow rates caused thereby.

Such a typical test of flow rates are shown diagrammatically or a plot of typical flow rates versus time are shown in FIG. 2 at a normal temperature T1. The flow increases initially rapidly with time after establishment of the flow through the low capacity passage 18 to a peak thereafter declining and, after a predetermined cycle time, reaches zero flow condition at the far right hand of FIG. 2, after the establishment of steady state flow conditions. The time period required for such establishment has been heretofore referred to as a "settle" time at which the flow rate to the cavity in the test part reaches a steady state condition, after elimination of various transient effects, such as adiabatic heating, etc.

According to a refinement referred to above, a higher speed leak detection test may be accomplished by measuring transient flow rates at an early time t in the "settle" time such as to speed up the test time required to conduct the leakage test as described in detail therein.

According to this refinement, the flow to the cavity is not determined after stabilization and the establishment of steady state flow conditions to and from the cavity, but rather is measured during the transient early stage in the pressurization cycle in order to greatly shorten the test cycle time. It has been found that at a predetermined time in the test cycle, which may be determined experimentally for each test part and cavity configuration, a repeatable flow rate to the cavity is achieved for each test part configuration, which bears a predictable, predetermined correspondence between the steady state flow rate, i.e., the leakage rate from the test cavity at the predetermined pressure of the fluid pressure source.

The flow rate to the test cavity may be measured at time t in the pressurization cycle after which repeatable flow rate has been achieved, with the time period being determined previously by testing of sample test parts. The flow rate to the cavity is converted to a steady state flow rate or leakage rate by calculations according to the correspondence previously determined to exist between the repeatable transient flow rate and the leakage flow rate observed during the empirical testing.

This refinement has been found to provide a very reliable and accurate measurement of the leakage rate while allowing a greatly reduced period of time to perform the leakage test. It has been determined that the correspondence between the transient, repeatable flow rate and the steady state leakage rate is a linear function such as to be easily computed by simple microprocessor circuits or other known methods of converting electrical signals.

In either approach, the leakage rate is either displayed or compared with an acceptable maximum leakage rate and an appropriate indication of the test provided such as a "reject" or "accept" visual indication, as is well known to those skilled in the art.

If the temperature of the test part is elevated, for example, to a different substantially higher temperature T2, such as 130° F., it has been found that the flow rate is drastically affected and may substantially extend the time necessary to achieve steady state conditions. Indeed, at the end of the "normal" settle time for a test part at a typical ambient temperature, there is indicated a negative flow, such being caused by heating of the air within the cavity and actual outflow from the cavity. This effect on the flow rate would be expected to be a factor until such time as the test part cools in the ambient air.

According to the concept of the present invention, a sample of each configuration or type or test part to be leak tested has its cavity placed in communication with a source of fluid under pressure as with the apparatus shown in FIG. 1, and the flow rates to the cavity measured at the same point in the test cycle, but for a plurality of temperatures of the test part. According to one aspect of the present invention, only two temperatures are necessary due to the fact that a linear relationship has been determined to exist between variations in temperature of the test part and shifts in flow rates caused by such temperature variation of the test parts. The establishment of the degree of shift in flow rate created by variations in temperature allows establishment of a temperature compensation function to allow a correction factor to be applied for a sensed temperature above (or below) a standard temperature.

Figure 3:
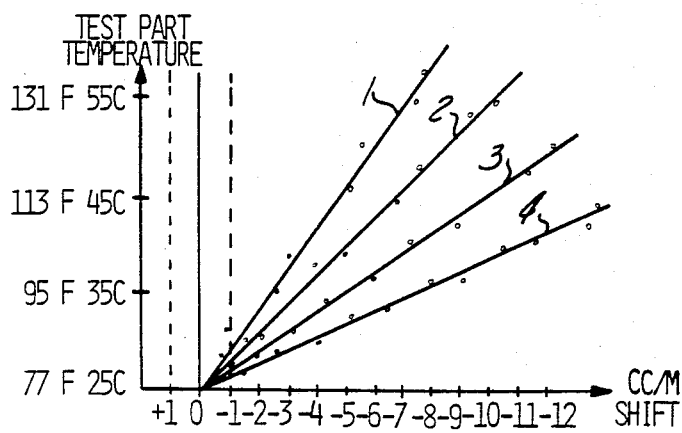
FIG. 3 is a plot of the shifts in flow rates occurring with temperature for each of a series of different test parameters.

As heretofore noted, this function has been determined to be linear, such as can be seen in FIG. 3, which represents a plot of test part temperatures versus the flow rate shift experienced during leakage flow rate testing, as described above.

For one sample of test part, a number of values of temperature of flow rate shift at increasing temperature from 77° F. (25° C.) to 121° F. (55° C.) are plotted. It can be seen that a straight line, 1, may be drawn through the test points with only minor scatter.

For differing types of test parts, the lines representing various temperature compensation functions would vary in slope, represented by lines 2, 3 and 4, but still comprise essentially straight line or linear functions; that is, in the mathematical form, $f(T)=B+AX$, where A and B are constants, B being a constant shifting the function value with the variations in the "standard" temperature at which the calibrated flow rate to the cavity is taken.

Accordingly, by measuring the flow rate shift in the passage 18 between a fluid pressure source and the cavity of a test part according to the leakage testing procedure described above, at two different temperatures, the temperature compensation function may be established by linear regression to provide a simple and quickly arrived at temperature compensation function.

Figure 4:
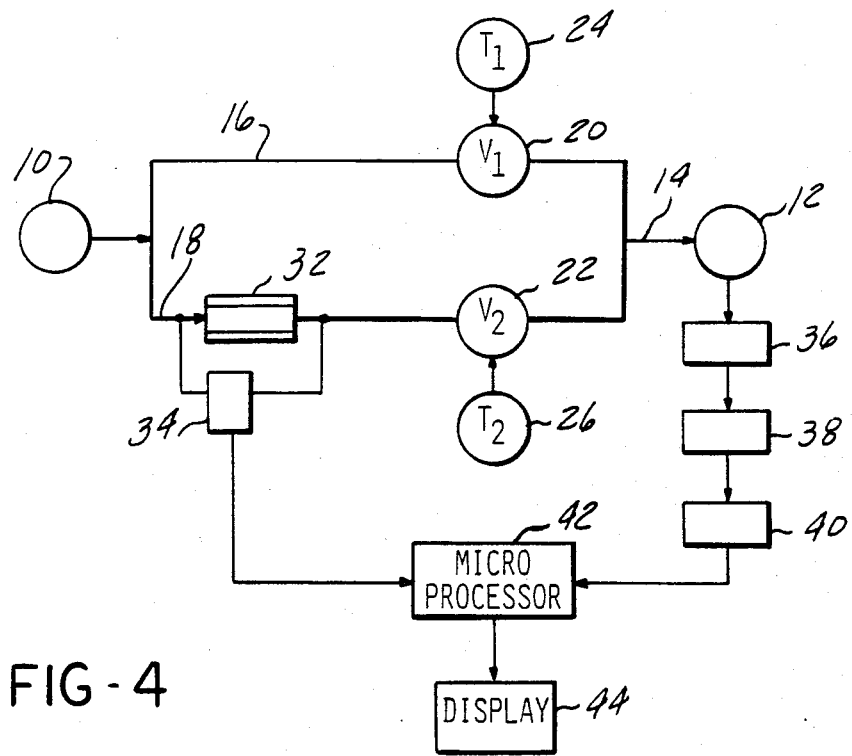
FIG. 4 is a block diagrammatic representation of a testing apparatus with which the method of the present invention may be practiced.

Referring to FIG. 4, a block diagram representation of a temperature compensated leak test system is depicted. The source 10 of fluid under pressure is, as before, able to be placed in communication with a high capacity prefill passageway 16 and a relatively low flow rate capacity passage 18, each ultimately in fluid communication with port passage 14 on which the cavity of a test part 12 may be placed to establish fluid communication therebetween. A valve 20 controls establishment of communication of the high capacity passageway 16 therebetween with a timer 24 establishing the interval of prefill pressurization therethrough. The low flow rate capacity passage 18 is preferably provided with a laminar flow element 32 and a differential pressure transducer 34 measuring the pressure across the laminar flow element 32 to thus enable generation of signals corresponding to the flow rates through the low capacity passage 18.

A solenoid valve 22 with timer 26 are also employed to control the test cycle time by control over the establishment of communication between the fluid pressure source 10 and the test cavity by the low rate capacity passageway 18. A temperature sensing transducer 36 is employed to sense the temperature of the test part 12, which may comprise a thermocouple, thermistor, or other temperature sensing element which produces an electrical analog signal corresponding to the temperature of the test part 12. Such analog signal is amplified in an amplifier 38 and is converted to digital form in an A/D converter 40.

A microprocessor 42 is preferably employed having a memory to store the particular temperature compensation function as previously determined by tests on samples of the test part types to be leak tested. Such temperature compensation value is applied to the flow rate signals 34 received from the differential pressure transducer 34 processed with other information to be stored such as the time in the cycle at which repeatable flow rates are achieved.

The acceptable leakage rates for the particular test parts are compared with measured flow rates after compensation for temperature variations.

An "accept" and "reject" visual indication is provided by display 44. The microprocessor 42 may also be suitably adapted to carry out conversion of transient flow rates to steady state flow rates in practicing the high speed test procedure described above.

Since all of these various elements are very well known, per se, to those skilled in the art, and their use in similar applications, and since the details thereof do not form a part of the present invention, the specifics are not herein disclosed.

Figure 5:
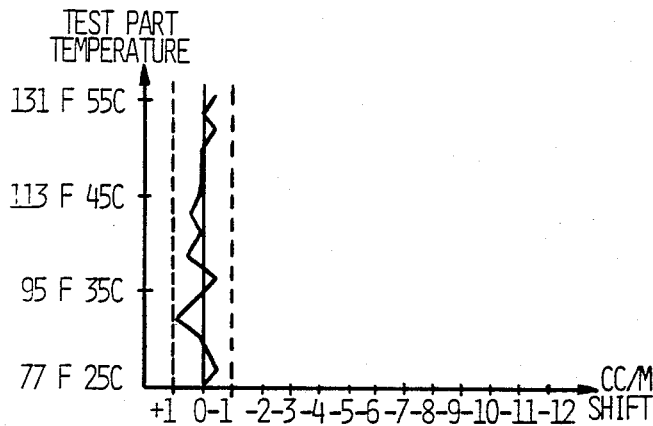
FIG. 5 is a plot of the shifts in flow rate for a given test part cavity over temperature range after having the temperature compensation function correction factor applied thereto throughout a temperature range.

According to FIG. 5, the effects of a typical temperature compensation may be seen in which values of flow rate shifts with temperature are plotted showing very minor degree in variation of flow over a range of temperatures extending from 77° F. (25° C.) to 131° F. (55° C.). The less than one cubic centimeter per minute shift indicated over the entire range is well within the acceptable error for such test part measurements.

Accordingly, it can be appreciated that the objects of the present invention are achieved by this method and a highly reliable yet relatively simple procedure established for achieving the results of the present invention.

Variations are of course possible within the scope of the appended claims, such as the different transducing or fluid pressure resting circuitry; different methods of processing the temperature and flow rate signals, other than with a microprocessor such as a general purpose computer, or specially designed control circuitry.

We claim:

1. A method of temperature compensating measurements of leak rates from a cavity in a part to be leak tested, said leak rate measurements achieved by placing said cavity in communication with a source of fluid under a predetermined pressure and measuring the flow rate to said cavity from said source, said method comprising the steps of:

initially establishing a temperature compensating function by:

placing said source of fluid pressure in communication with the cavity of a sample part, at each of a plurality of temperatures of said sample;

measuring the shift in flow rate to said cavity of said sample part caused by a change between said plurality of temperatures;

measuring each of said plurality of temperatures;

generating by linear regression from said measured temperatures and flow rates a temperature compensation function;

placing the cavity of each part to be leak tested in communication with said source of fluid at said predetermined pressure;

measuring the flow rate to said cavity from said source of fluid at said predetermined pressure;

measuring the temperature of said part to be tested;

applying a temperature compensation factor from said generated temperature compensation function corresponding to said measured flow rate, whereby a temperature corrected flow rate to said cavity is determined.

2. The method according to claim 1 wherein in said step of establishing a temperature compensating function, flow rates to said cavity of said sample test part at first and second temperatures are measured, and a linear regression is generated therefrom to establish a linear temperature compensation function.

3. The method according to claim 2 including the steps of testing sample test parts to determine at what time after initiation of pressurization of said cavities repeatable transient flow rates occur; determining the correspondence between said repeatable flow rates and steady state flow rates occurring after completion of pressurization of said cavities; measuring said flow rate to said cavity at said determined time after initiation of pressurization of said cavity at which repeatable transient flow rates occur; and converting said transient flow rates to said steady state flow rates.

4. The method according to claim 1 wherein in said step of placing said cavities of each of said sample and test parts in communication with said source of fluid pressure, a flow passage of large flow capacity is initially used to place said source of fluid pressure and said cavity in communication with each other, and a separate small capacity flow rate passage is used to subsequently solely place said fluid pressure source and cavity in communication with each other to provide a rapid prefill of said cavity, and wherein said flow rate measurements are performed with respect to flow through said small capacity flow rate passage when said passage solely connects said fluid pressure source and said cavity.

* * * * *